United States Patent
El-Beltagy et al.

(10) Patent No.: US 9,680,926 B2
(45) Date of Patent: *Jun. 13, 2017

(54) NEAREST PEER DOWNLOAD REQUEST POLICY IN A LIVE STREAMING P2P NETWORK

(71) Applicant: Hive Streaming AB, Stockholm (SE)

(72) Inventors: Mohammed El-Beltagy, Stockholm (SE); Amgad Naiem, Stockholm (SE); Fouad Essayadi, Stockholm (SE)

(73) Assignee: Hive Streaming AB, Stockholm (SE)

( * ) Notice: Subject to any disclaimer, the term of this patent is extended or adjusted under 35 U.S.C. 154(b) by 864 days.

This patent is subject to a terminal disclaimer.

(21) Appl. No.: 13/720,372

(22) Filed: Dec. 19, 2012

(65) Prior Publication Data

US 2014/0172978 A1    Jun. 19, 2014

(51) Int. Cl.
*H04L 29/08* (2006.01)
(52) U.S. Cl.
CPC ................ *H04L 67/1046* (2013.01)
(58) Field of Classification Search
None
See application file for complete search history.

(56) References Cited

U.S. PATENT DOCUMENTS

| | | |
|---|---|---|
| 7,633,887 B2 | 12/2009 | Panwar et al. |
| 7,805,518 B1 | 9/2010 | Kamvar et al. |
| 8,169,916 B1 * | 5/2012 | Pai et al. ............... 370/238 |

(Continued)

FOREIGN PATENT DOCUMENTS

EP    1821487 A1    8/2007

OTHER PUBLICATIONS

Vlavianos, Angelos, Marios Iliofotou, and Michalis Faloutsos. "BiToS: Enhancing BitTorrent for supporting streaming applications." INFOCOM 2006. 25th IEEE International Conference on Computer Communications. Proceedings. IEEE, 2006.*

(Continued)

*Primary Examiner* — Scott B Christensen
*Assistant Examiner* — Lam Do
(74) *Attorney, Agent, or Firm* — Volpe and Koenig, P.C.

(57) ABSTRACT

The present invention relates to a method of and a device for, arranging peers in a P2P network comprising a streaming source and network peers arranged at distribution levels in the P2P network. The method comprises receiving a request from a peer entering the network to receive data content, and determining a distribution level in the P2P network at which the entering peer is to be arranged with respect to the streaming source. Further, the method comprises providing the entering peer with a plurality of peers selected from the network peers from which the requested data content can be downloaded with an expected probability depending on the determined distribution level, and further indicating the distribution level of each of the plurality of peers, wherein the entering peer is enabled to download, with the expected probability, the requested data content from a selected one of said plurality of peers being arranged at a distribution level closest to that determined for the entering peer.

The present invention further relates to a method of requesting data content in a P2P network and a peer device.

24 Claims, 11 Drawing Sheets

(56) References Cited

U.S. PATENT DOCUMENTS

| | | | |
|---|---|---|---|
| 2003/0126199 A1* | 7/2003 | Kadri | H04L 29/06 709/203 |
| 2005/0044147 A1* | 2/2005 | Yap | H04L 67/104 709/205 |
| 2005/0078610 A1* | 4/2005 | Previdi | H04L 45/02 370/254 |
| 2006/0053209 A1 | 3/2006 | Li | |
| 2006/0069800 A1 | 3/2006 | Li | |
| 2006/0080454 A1 | 4/2006 | Li | |
| 2006/0168111 A1 | 7/2006 | Gidwani | |
| 2006/0215582 A1 | 9/2006 | Castagnoli et al. | |
| 2006/0215583 A1 | 9/2006 | Castagnoli | |
| 2007/0025353 A1 | 2/2007 | Nambisan et al. | |
| 2007/0028133 A1 | 2/2007 | Izutsu et al. | |
| 2007/0110009 A1 | 5/2007 | Bachmann et al. | |
| 2007/0178908 A1 | 8/2007 | Doyle | |
| 2007/0280255 A1 | 12/2007 | Tsang et al. | |
| 2007/0294422 A1 | 12/2007 | Zuckerman et al. | |
| 2008/0133767 A1* | 6/2008 | Birrer et al. | 709/231 |
| 2008/0140853 A1 | 6/2008 | Harrison | |
| 2008/0261580 A1 | 10/2008 | Wallentin et al. | |
| 2008/0291822 A1 | 11/2008 | Farkas et al. | |
| 2009/0034434 A1 | 2/2009 | Tsang et al. | |
| 2009/0164576 A1* | 6/2009 | Noh | H04N 21/4331 709/204 |
| 2009/0182815 A1* | 7/2009 | Czechowski et al. | 709/206 |
| 2009/0202221 A1 | 8/2009 | Guo | |
| 2009/0234917 A1* | 9/2009 | Despotovic et al. | 709/204 |
| 2009/0265473 A1 | 10/2009 | Hydrie et al. | |
| 2010/0030909 A1 | 2/2010 | Magharei | |
| 2010/0146092 A1* | 6/2010 | Hu et al. | 709/223 |
| 2010/0146569 A1 | 6/2010 | Janardhan et al. | |
| 2010/0235432 A1 | 9/2010 | Trojer | |
| 2011/0131278 A1 | 6/2011 | Nieh et al. | |
| 2011/0153835 A1* | 6/2011 | Rimac | H04L 67/104 709/227 |
| 2012/0151051 A1 | 6/2012 | Zhang et al. | |
| 2012/0221640 A1 | 8/2012 | Cohen | |
| 2013/0066969 A1 | 3/2013 | Cohen | |

OTHER PUBLICATIONS

Zhou, Yipeng, Dah-Ming Chiu, and John CS Lui. "A simple model for chunk-scheduling strategies in P2P streaming." Networking, IEEE/ACM Transactions on 19.1 (2011): 42-54.*

Zhang, Xinyan, et al. "CoolStreaming/DONet: a data-driven overlay network for peer-to-peer live media streaming." INFOCOM 2005. 24th Annual Joint Conference of the IEEE Computer and Communications Societies. Proceedings IEEE. vol. 3. IEEE, 2005.*

Ren, Dongni, Y-TH Li, and S-HG Chan. "Fast-mesh: a low-delay high-bandwidth mesh for peer-to-peer live streaming." Multimedia, IEEE Transactions on 11.8 (2009): 1446-1456.*

Ren, Dongni, Y-TH Li, and S-HG Chan. "On reducing mesh delay for peer-to-peer live streaming." INFOCOM 2008. The 27th Conference on Computer Communications. IEEE. IEEE, 2008.*

Adler, Micah, et al. "Optimal peer selection for P2P downloading and streaming." INFOCOM 2005. 24th Annual Joint Conference of the IEEE Computer and Communications Societies. Proceedings IEEE. vol. 3. IEEE, 2005.*

Zhao, Bridge Qiao, John Chi-Shing Lui, and Dah-Ming Chiu. "Exploring the optimal chunk selection policy for data-driven P2P streaming systems." Peer-to-Peer Computing, 2009. P2P'09. IEEE Ninth International Conference on. IEEE, 2009.*

S. Tang, H. Wang, and P. Van Mieghem, "The Effect of Peer Selection with Hopcount or Delay Constraint on Peer-to-Peer Networking;" http://link.springer.com/chapter/10.1007/978-3-540-79549-0_31, May 5, 2008.*

Lou, Xiaosong, and Kai Hwang. "Quality of data delivery in peer-to-peer video streaming." ACM Transactions on Multimedia Computing, Communications, and Applications (TOMM) 8.1S (2012): 12.*

Wu, Yunnan, Saumitra M. Das, and Ranveer Chandra. "Routing with a Markovian metric to promote local mixing." INFOCOM 2007. 26th IEEE International Conference on Computer Communications. IEEE. IEEE, 2007.*

Richarme, Michael, "Eleven Multivariate Analysis: Techniques Key Tools in Your Marketing Research Survival Kit" http://www.decisionanalyst.com/Downloads/MultivariateAnalysisTechniques.pdf, 2002.*

Wang, Yao, and Julita Vassileva. "Bayesian network trust model in peer-to-peer networks." Agents and Peer-to-Peer Computing. Springer Berlin Heidelberg, 2003. 23-34.*

Nianwang, Liu; Zheng, Wen;, Kwan, Yeung; Zhibin, Lei, "Request-Peer Selection for Load-Balancing in P2P Live Streaming Systems;" Apr. 1, 2012; http://ieeexplore.ieee.org/document/6214363/?arnumber=6214363&tag=1.*

Srinivasan, Keshav; "Mathematical Foundations of Computer Networking;" Apr. 20, 2012; https://books.google.com/books/about/Mathematical_Foundations_of_Computer_Net.html?id=KI9KDgzH52cC.*

Ilias, Chatzidrossos, Gyorgy, Dan, Viktoria, Fodor; "Delay and Playout Probability Trade-Off in Mesh-Based Peer-to-Peer Streaming with Delayed Buffer Map Updates;" May 22, 2009; http://link.springer.com/article/10.1007/s12083-009-0049-3.*

Written Opinion of the International Preliminary Examination Authority, dated Nov. 24, 2014, 6 pgs.

Notification of Transmittal of the International Preliminary Report on Patentability, dated Dec. 22, 2014, 14 pgs.

Small et al., "Scaling Laws and Tradeoffs in Peer-to-Peer Live Multimedia Streaming", ACM Multimedia 2006 & Co-Located Workshops: Oct. 23-27, 2006, Santa Barbara, CA.

* cited by examiner

NEAREST PEER DOWNLOAD REQUEST POLICY IN A LIVE STREAMING P2P NETWORK

TECHNICAL FIELD

The invention relates to a method of arranging peers in a P2P network and a device for arranging peers in a P2P network, as well as a method for a peer device to request download of content, and a peer device.

BACKGROUND

For live video streaming in a client-server approach, the video stream is downloaded from the streaming server (i.e. source) to the client. A video stream consists of a set of consecutive data pieces, or data subset, that the client periodically requests in order to play the video. A scalable live streaming service requires high streaming server bandwidth to satisfy an increasing number of clients over the internet. In order to reduce the cost of the streaming server, Peer-to-peer (P2P) live streaming has been developed. The basic concept of P2P live streaming is to make the clients, referred to as peers in this context, share the load with the streaming server.

P2P live streaming systems has gained a lot of interest in the recent years as it has the advantage of allowing a streaming source to broadcast e.g. a live video event to a large number of peers, without having to provide all the required bandwidth. This is done by making use of the peers' upload capacity to assist the streaming source in broadcasting the content to the peers.

P2P networks comprise any networks composed of entities that each provides access to a portion of their resources (e.g., processing capacity, disk storage, and/or bandwidth) to other entities. The P2P concept differs from traditional client/server architecture based networks where one or more entities (e.g., computers) are dedicated to serving the others in the network. Typically, entities in a P2P network run similar networking protocols and software. Applications for P2P networks are numerous and may for example comprise transporting and/or storing data on the Internet, such as video distribution for content owners.

Many approaches have been developed to efficiently make use of the upload capacity of the peers. These approaches can be divided into two main categories.

Tree-based systems are based on constructing one or more structured trees in an overlay network where peers at the top of each tree feed the peers below them. This approach works well when the peers do not join or leave the system at high frequency as data flow is achieved without any further messages between the peers. However, in a high churn environment, tree maintenance can be very costly and sometimes destruction and reconstruction of the tree(s) are necessary.

Mesh-based systems do not enforce a tree construction, or in other words peer connectivity does not form a specified overlay, and they are connected to each other in an unstructured manner. They exchange data through so called gossip communication or by sending data request messages to each other. A disadvantage with mesh-based systems is that they can have a long setup time, as nodes need to negotiate with each other to find peers. However, many systems use the mesh-based approach as it is very robust to high churn. In such systems each peer has a number of neighbours that it potentially downloads from and failure of any neighbour is thus not as critical as in tree-based approaches.

Although individual peers take decisions locally without a global view in the mesh-based approaches, they can still reach comparable savings to tree based approaches when peer churn is considered, mainly since they do not have to carry the heavy overhead of maintaining a view of the global connectivity structure.

In a decentralized P2P live streaming network, each peer has k neighbouring peers from which it can attempt to download data content. Thus, the peer will try to find a neighbouring peer that it can download from instead of downloading the data content from the streaming server. Given such a prior art overlay network, if the peers start streaming data content from the same point in time, all the peers will not find an uploading peer that has useful content. Hence, almost all the peers will download from the streaming server, which ultimately leads to minimal savings in streaming server bandwidth utilization.

SUMMARY

An object of the present invention is to solve or at least mitigate these problems in the art.

This object is attained in a first aspect of the present invention by a method of arranging peers in a P2P network comprising a streaming source and network peers arranged at distribution levels in the P2P network. The method comprises receiving a request from a peer entering the network to receive data content, and determining a distribution level in the P2P network at which the entering peer is to be arranged with respect to the streaming source. Further, the method comprises providing the entering peer with a plurality of peers selected from the network peers from which the requested data content can be downloaded with an expected probability depending on the determined distribution level, and further indicating the distribution level of each of the plurality of peers, wherein the entering peer is enabled to download, with the expected probability, the requested data content from a selected one of said plurality of peers being arranged at a distribution level closest to that determined for the entering peer.

This object is attained in a second aspect of the present invention by a device for arranging peers in a P2P network comprising a streaming source and network peers arranged at distribution levels in the P2P network. The device comprises a processing unit arranged to receive a request from a peer entering the network to receive data content, and to determine a distribution level in the P2P network at which the entering peer is to be arranged with respect to the streaming source. The processing unit is further arranged to provide the entering peer with a plurality of peers selected from the network peers from which the requested data content can be downloaded with an expected probability depending on the determined distribution level, and further to indicate the distribution level of each of the plurality of peers, wherein the entering peer is enabled to download, with the expected probability, the requested data content from a selected one of said plurality of peers being arranged at a distribution level closest to that determined for the entering peer.

This object is attained in a third aspect of the present invention by a method of requesting data content in a P2P network comprising a streaming source and a plurality of network peers arranged at distribution levels in the P2P network. The method comprises sending, from an entering peer. a request to a network supervising entity to receive data content, and receiving an indication of a distribution level at which the entering peer is to be arranged with respect to the streaming source, and a list indicating a plurality of peers selected from the network peers from which the requested data content can be downloaded with an expected probability depending on the determined distribution level and which list further indicates the distribution level of each of the plurality of peers. The method further comprises sending a download request to a selected one of the plurality of peers indicated to be arranged at a distribution level closest to that determined for the entering peer, and downloading the requested data content from the selected peer with the expected probability.

This object is attained in a fourth aspect of the present invention by a peer device for requesting data content in a P2P network comprising a streaming source and a plurality of network peers arranged at distribution levels in the P2P network. The device comprises a processing unit arranged to send a request to a network supervising entity to receive data content, and to receive an indication of a distribution level at which the peer device is to be arranged with respect to the streaming source, and a list indicating a plurality of peers selected from the network peers from which the requested data content can be downloaded with an expected probability depending on the determined distribution level, which list further indicates the distribution level of each of the plurality of peers. The processing unit is further arranged to send a download request to a selected one of the plurality of peers indicated to be arranged at a distribution level closest to that determined for the entering peer, and to download the requested data content from the selected peer with the expected probability.

Advantageously, by carefully selecting an appropriate distribution level for the entering peer, the possibility of having the entering peer download from one of its neighbouring peers can be increased. Analogously, this decreases the risk of having a peer download the data content from the streaming source.

Further, the list provided to the entering peer contains information regarding distribution level of the respective peer. The entering peer will select a peer being arranged at a closest distribution level when sending a download request to a selected one of the neighbouring peers provided on the list.

In P2P networks, there is a risk that peers being arranged at a low distribution level with respect to the streaming source, i.e. peers being located close to the streaming source, will be assigned a greater load than those peers which are further away from the streaming source, i.e. peers arranged at a higher level, even if the distribution over levels is assumed to be uniform. That is because peers at lower level potentially will be a target for content requests from all peers at subsequent levels. Hence, if streaming server savings are to be improved, there is a trade-off between increasing density among peers having low latency with respect to the real-time playback point, i.e. peers arranged at a level closer to the source, to handle the load from peers having higher latency, and increasing the probability that peers will download directly from the streaming server since the density of peers closes to the streaming server is increased. Therefore, it may be desirable to construct the P2P network such that a selection policy is applied where peers will prioritize their nearest neighbouring peers, in which case a significant load balancing among the peers in the network can be achieved. With the present invention, the load among peers in the network will be better distributed.

In an embodiment of the present invention, the request from the entering peer comprises its upload capacity. In yet another embodiment, the determination of distribution level of the entering peer comprises sampling the determined distribution level from a conditional probability distribution of distribution level and upload capacity for the network peers. Advantageously, in this particular embodiment, the entering peer is thus assigned a distribution level which takes into account its upload capacity, which will further facilitate optimization of the P2P network.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
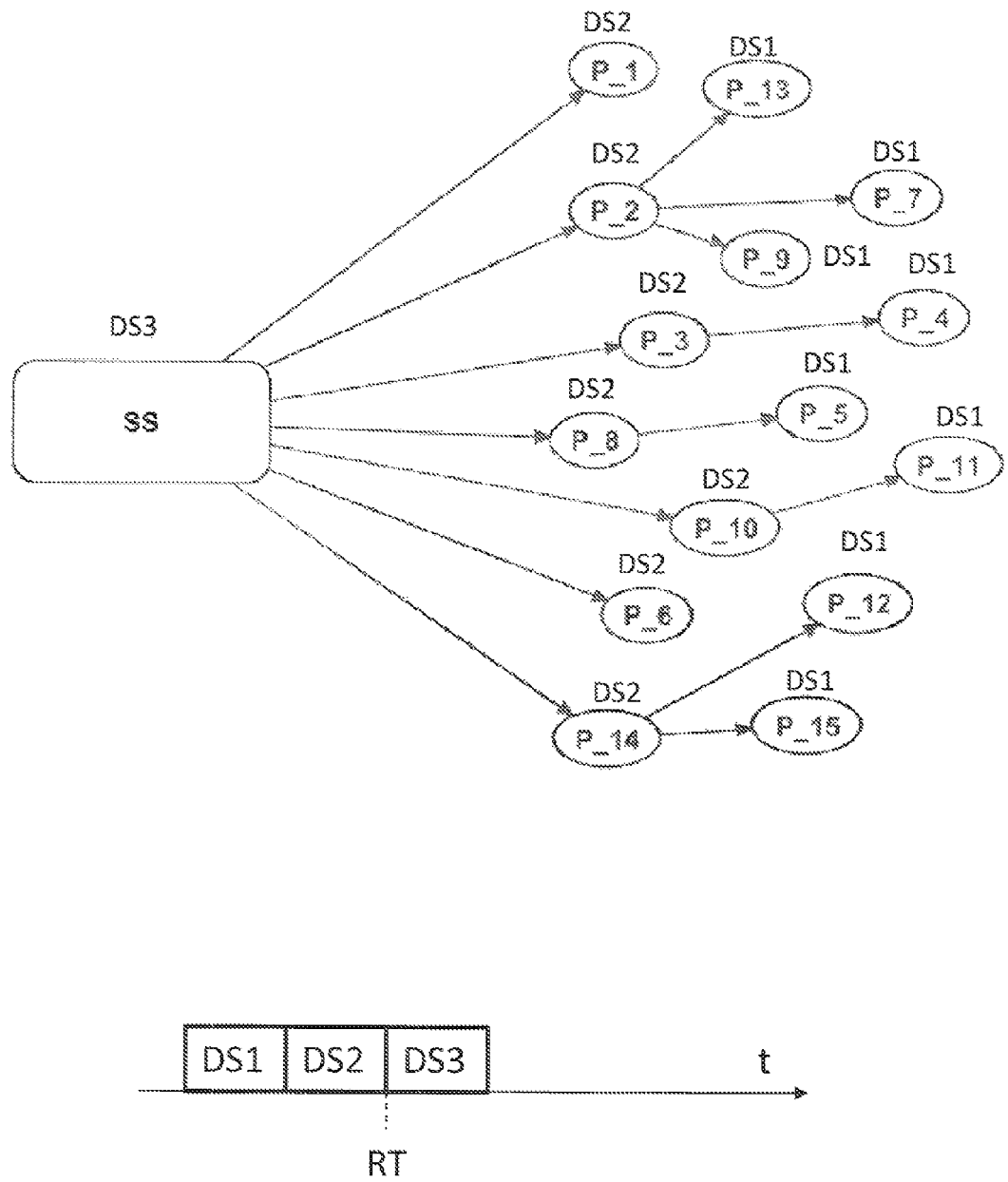
FIG. 1 illustrates data streaming in a prior art live streaming P2P network.

FIG. 1 shows a prior art P2P overlay network with peers $p_1$-$p_{15}$ (in practice peer devices such as televisions sets, mobile phones, computers, etc.) randomly connected to a streaming source in the form of a streaming server SS. Streaming source and streaming server will be used alternately throughout the application to denote the same network element. The streaming server distributes data content divided into smaller pieces of data that are streamed to the network peers. Thus, the data content is divided into consecutive pieces of data referred to as data subsets throughout this application. This is illustrated in the lower section of FIG. 1, where the data content is divided into smaller data subsets DS1-DS3. Once the streaming source SS has "packeted" a data subset DS, it can be submitted to a peer, which then can start playback of the data subset while the streaming source produces the next data subset. In FIG. 1, the streaming server uploads data subset DS1 to peers $p_1$, $p_2$, $p_3$, $p_6$, $p_8$, $p_{10}$ and $p_{14}$, wherein playback of DS1 may resume at each respective peer and/or further distribution of DS1 may be effected by the respective peer to further downstream peer(s). Further, the streaming server produces data subset DS2 and uploads data subset DS2 to the peers $p_1$, $p_2$, $p_3$, $p_6$, $p_8$, $p_{10}$ and $p_{14}$, while peer $p_2$ uploads the latest fully downloaded data subset DS1 to peers $p_7$, $p_9$ and $p_{13}$, peer $p_3$ uploads DS1 to peer $p_4$, and so on.

Hence, in such a prior art P2P live streaming network, each peer entering the network will ask a tracker (not shown) for the latest data subset to start streaming from as well as k random peers to be its neighbours. Then, the entering peer will turn to its neighbours for the latest subset of data, and if it finds the required data subset on any neighbouring peer, it will start streaming from that neighbouring peer. As has been explained in the above, due to network delay and asynchronicity, the entering peer will be delayed by at least the full duration of one data subset from its uploader and at least twice that from the streaming server on condition that the entering peer's uploader is delayed by at least the full duration of one data subset from the source. In other words, with respect to a real-time playback point RT of the data content distributed by the streaming source, the entering peer will have a latency of at least two data subsets, while its uploader will have a latency of at least one data subset. If the entering peer cannot find the latest data subset on one of its neighbouring peers, it will download it from the streaming server. As compared to a traditional client-server network, where the server distributes content to all clients in the network, savings in streaming server load of the P2P network in FIG. 1 is 8/15=0.53. That is, instead of streaming content to all 15 peers, the streaming server SS streams content to seven of the peers, which in their turn unload the server by streaming content to the remaining eight peers.

Figure 2A:
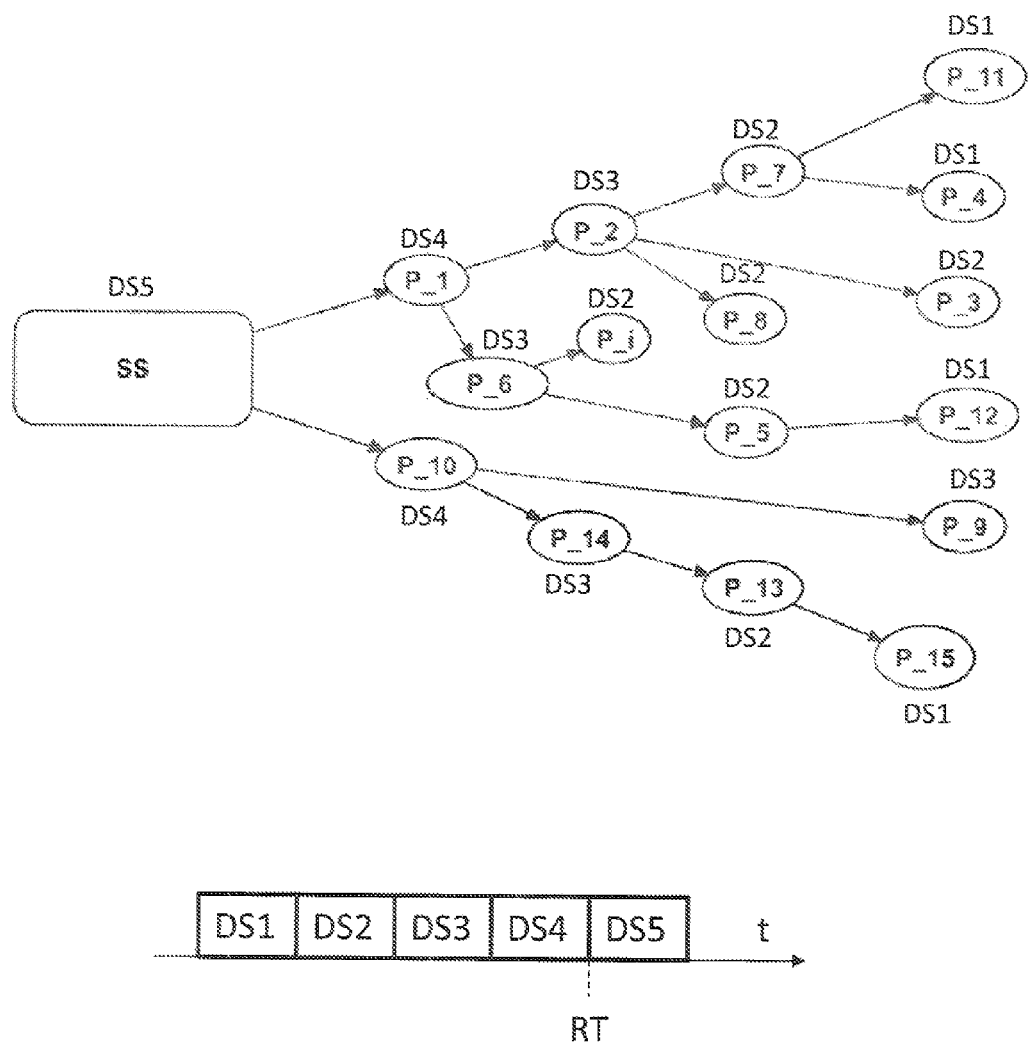
FIGS. 2a and b illustrate data streaming in a live streaming P2P network in which the present invention may be applied.

Now, with reference to FIG. 2a this could further be improved to attain even higher savings. A new peer $p_i$ is entering the network and requests the tracker (not shown) to receive data content originally streamed from the streaming source SS. The tracker determines that the latency, with respect to a real-time playback point RT of the data content distributed by the streaming source, with which the entering peer is to receive the data content is $d_i$ time units, i.e. the entering peer will receive and be able to playback a data subset $d_i$ time units after the same data subset have been rendered in real-time by the streaming source. The tracker will then provide the entering peer with a list of randomly selected peers from which the data content can be downloaded. This list of peers is derived or sampled from a probability density function for the peer as a function of latency. Thus, the entering peer $p_i$ is enabled to download, from a selected subset of the listed peers having a lower latency than that determined for the entering peer, the data content with the determined latency $d_i$ with respect to the real-time playback point RT of the streaming source SS.

With reference again to FIG. 2a, the data subset which is rendered by the streaming source SS in real-time when the peer $p_i$ enters the network is DS5. Assuming for example that the determined latency $d_i$ is 3 units and expressed in a resolution of data subset durations, i.e. the determined latency is three full data subsets, and the list provided by the tracker to the entering peer $p_i$ comprises peers $p_2$, $p_5$, $p_6$, $p_7$ and $p_8$ (in practice this number is substantially higher), the entering peer $p_i$ can find the required data subset DS2 at either peer $p_2$ or $p_6$, being the latest fully downloaded data subset stored in a playback buffer of $p_2$ and $p_6$, respectively. Hence, DS2 is the latest data subset that can be uploaded by peer $p_2$ and $p_6$. In this particular example, since peer $p_2$ is uploading to three other peers, it may be preferred that the entering peer $p_i$ downloads from $p_6$. It should be noted that the entering peer cannot download from either one of $p_5$, $p_7$ or $p_8$ since they all are rendering data subset DS2 at the moment peer $p_i$ is entering the network. Thus, the latest fully downloaded data subset stored in the respective playback buffer of $p_5$, $p_7$ and $p_8$ is data subset DS1. In this context, an alternative definition of "latency" will be introduced. As can be seen in FIG. 2a, the determined latency $d_i$ for the entering peer $p_i$ is 3 units. Thus, the entering peer is placed at a third "distribution level" in the P2P network. Further, peers $p_1$ and $p_{10}$ reside at the first level (the streaming server SS is always at level zero), while peers $p_2$, $p_6$ and $p_{14}$ are positioned in the second layer, and so on. A distribution level in a P2P network is occasionally referred to as a "distribution layer". Thus, a network peer will download data content from a peer on a higher distribution level, i.e. an upstream peer, while the network peer will upload data content to a peer on a lower distribution level, i.e. a downstream peer. Hence, a peer placed on level 2 (i.e. d=2) will download data from either peers placed on level 1 (i.e. at d=1) or the streaming source itself (located at d=0). Correspondingly, a peer placed on level 2 (i.e. d=2) will upload data to either peers placed on level 3 (i.e. d=3) or peers placed further downstream (i.e. d≥4).

I should be noted that in most P2P networks for livestreaming peers, the peers have a buffer that allows for continuous playback even if there are some interruptions in the downloaded data pieces. In fact, a given distribution level may contain peers which are slightly behind or ahead (due to e.g. delay variations and asynchronicity) the other peers at the same level in terms of absolute latency, but still within a carefully chosen tolerance such that it safely can be asserted that, with respect to playback of the peers that are positioned at the next downstream level, all peers at the upstream level always possess content that is useful for the downstream uploaders in a manner that will not induce playback interruptions.

As compared to a traditional client-server network, savings in streaming server load of the P2P network in FIG. 2a is 13/15=0.87. That is, instead of streaming content to all 15 peers, the streaming source SS streams content to two of the peers, which in their turn relieve the source from load by streaming content to the remaining 13 peers.

In the example, the determined latency with which an entering peer downloads data content with respect to a real-time playback point RT of the data content distributed by the streaming source is represented by time units equivalent to the duration of a data subset. As an example, if in a P2P network the duration of a distributed data subset is 300 ms, a latency of one unit implies that a peer downloads a data subset 300 ms after the same data subset has been rendered by the streaming source. Thus, the downloading peer is located at a first distribution level, i.e. the first level downstream from the streaming source. In practice, there may be some fluctuation in the latencies. Thus, in line with that described in the above, a peer with a latency in the range 250-350 ms could be positioned at the first level, a peer with a latency in the range 550-650 ms could be positioned at the second level, etc.

Figure 2B:
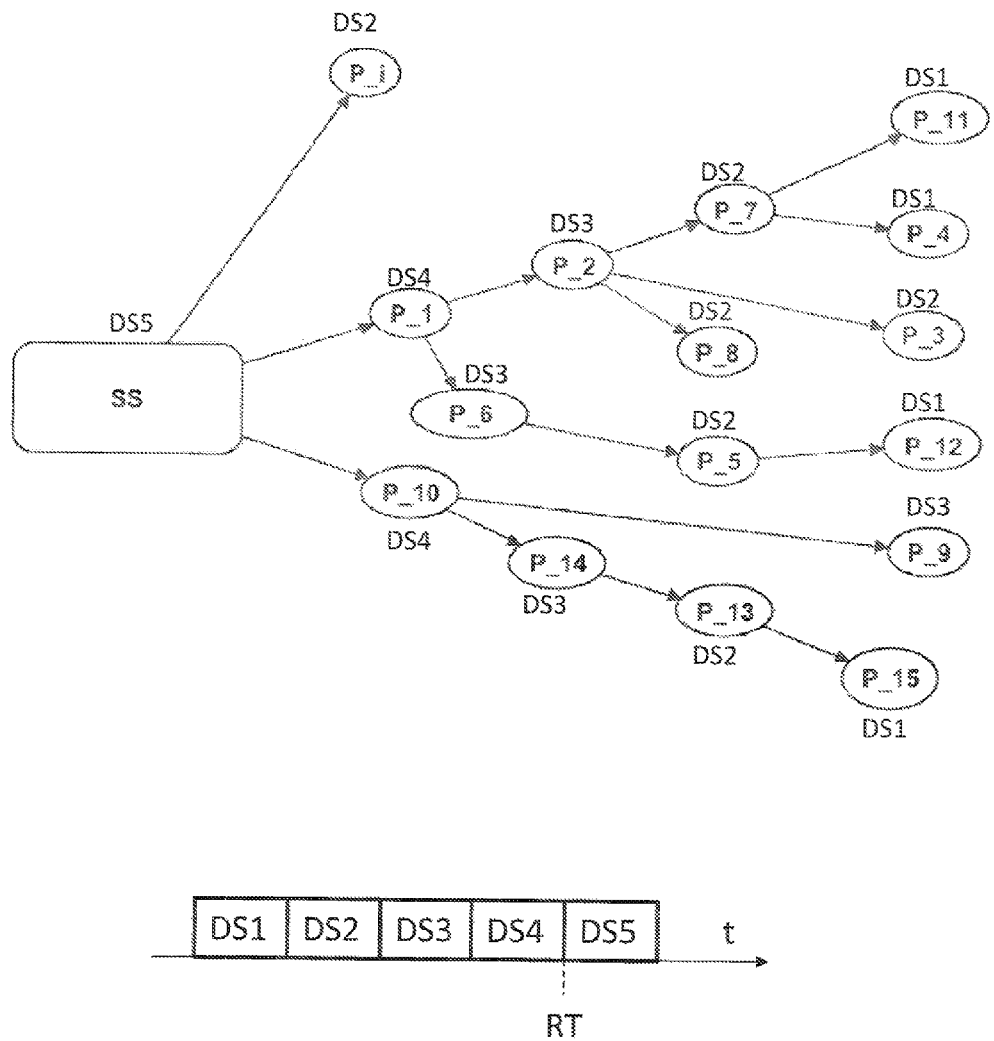

FIG. 2b illustrates a further example, where the tracker (not shown) again determines that the entering peer $p_i$ should be placed at the third distribution level, i.e. $d_i=3$. In this particular example, the list provided by the tracker to the entering peer $p_i$ comprises peers $p_3$, $p_4$, $p_7$, $p_8$ and $p_{11}$. In this case, with the entering peer $p_i$ placed at the third level, it cannot find the required data subset DS2 at either of the listed peers. For peers $p_4$ and $p_{11}$, the latest fully downloaded data subset stored in the respective playback buffer is DS0, while peers $p_3$, $p_7$ and $p_8$ have DS1 as the latest fully downloaded data subset. Thus, none of the listed peers can upload the required data subset DS2 to the entering peer, which has as a consequence that the entering peer must turn to the streaming source SS for the required data subset.

Figure 3:
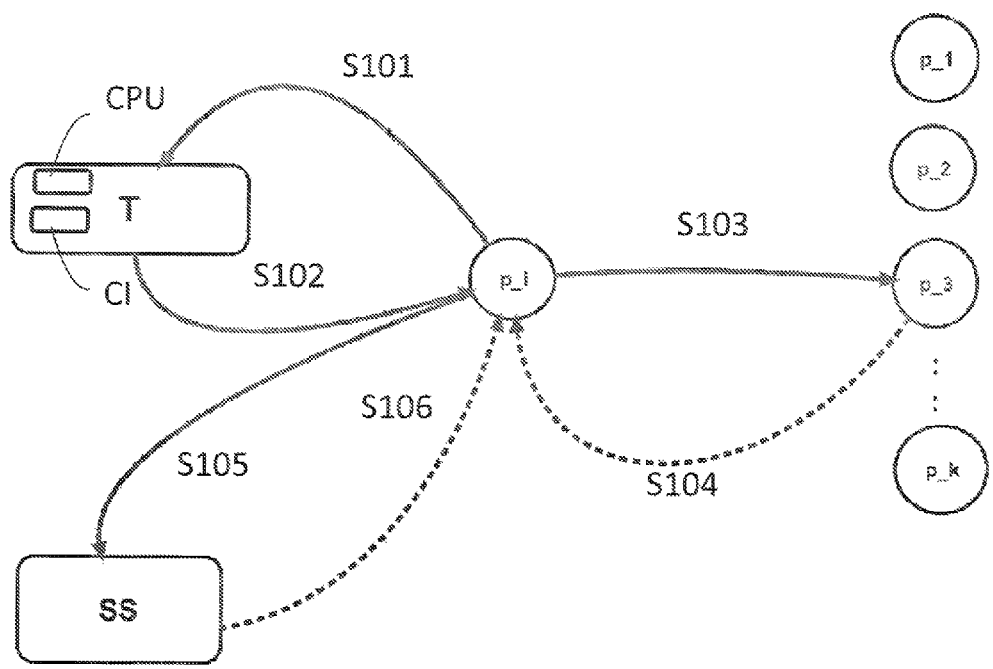
FIG. 3 illustrates the function of a tracker in which the method of an aspect of the present invention may be applied.

FIG. 3 shows a P2P network in which embodiments of the present invention could be implemented, which Figure further illustrates the teachings set forth in connection to FIGS. 2a and 2b. Continuous lines denote request/reply messages, while dashed lines denote streaming channels. A new peer $p_i$ enters the network and requests the tracker T in step S101 via its communication interface CI to receive data content originally streamed from the streaming source SS. The tracker determines the level at which the entering peer $p_i$ is to be arranged and provides in step S102 the entering peer with a list of k randomly selected peers from which the data content can be downloaded. Thus, the entering peer requests in step S103 one of the peers on the list to supply it with the latest subset of data given the determined network level for the entering peer. If there exists at least one peer out the k randomly selected peers which is arranged at a level closer to the streaming source than that determined for the entering peer, the requested data content will be uploaded in step S104 to the entering peer with some given probability. In FIG. 3, peer $p_3$ uploads the requested data content to the entering peer $p_i$. Depending on how the level for the entering peer is selected, the probability that a peer can upload the requested data content to the entering peer in step S104 can be increased. If no randomly selected peer exists which is located at a level closer to the source than that determined for the entering peer, i.e. all k peers are at level which is equal to or further downstream that the level that is determined for the entering peer, the requested data content cannot be uploaded in step S104 to the entering peer. In that case, the entering peer will in step S105 turn to the streaming server SS for the requested data content, which in its turn will upload the requested data content to the entering peer in step S106. Analogously, depending on how the level for the entering peer is selected, the probability that the streaming server will have to upload the requested data content to the entering peer in step S106 can be decreased. These probabilities will be discussed in detail later on in the detailed description.

The tracker determines the delay $d_i$ when an entering peer is to receive the content data, with respect to a real-time playback point RT of the data content uploaded by the streaming source SS on the basis of statistical information. The behaviour of a P2P network in which the present invention is implemented is stochastic, which is based on currently streaming network peers. Thus, statistical information should be considered such that a probability distribution that represents the behaviour of peers in the P2P live streaming network can be formed. Given the probability distribution p(d) of the distribution levels of the peers with respect to the streaming server, expected savings in the streaming server bandwidth load can be calculated. Thus, by setting a level which follows the distribution p(d) for each entering peer, the savings of the stream server will approach the expected savings calculated using the said distribution. Or to put it in another way: by determining an appropriate level at which the entering peer is to be arranged in the network, the probability that a network peer can be found from which the entering peer can download requested data content can be increased. Thus, the savings in the streaming server bandwidth is directly related to the probability that a network peer can upload requested data content to the entering peer.

With reference to FIG. 3, the tracker T for performing the method of arranging peers in a P2P network according to embodiments of the present invention, as well as the peer device $p_i$ according to embodiments of the invention, are typically equipped with one or more processing units 15, 18 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to at least partly carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a compact disc or a memory stick. As a further alternative, the computer program 17 may be downloaded to the storage medium 16 over a network. The processing unit 15 may alternatively be embodied in the form of an application specific integrated circuit (ASIC), a field-programmable gate array (FPGA), a complex programmable logic device (CPLD), etc.

Figure 4:
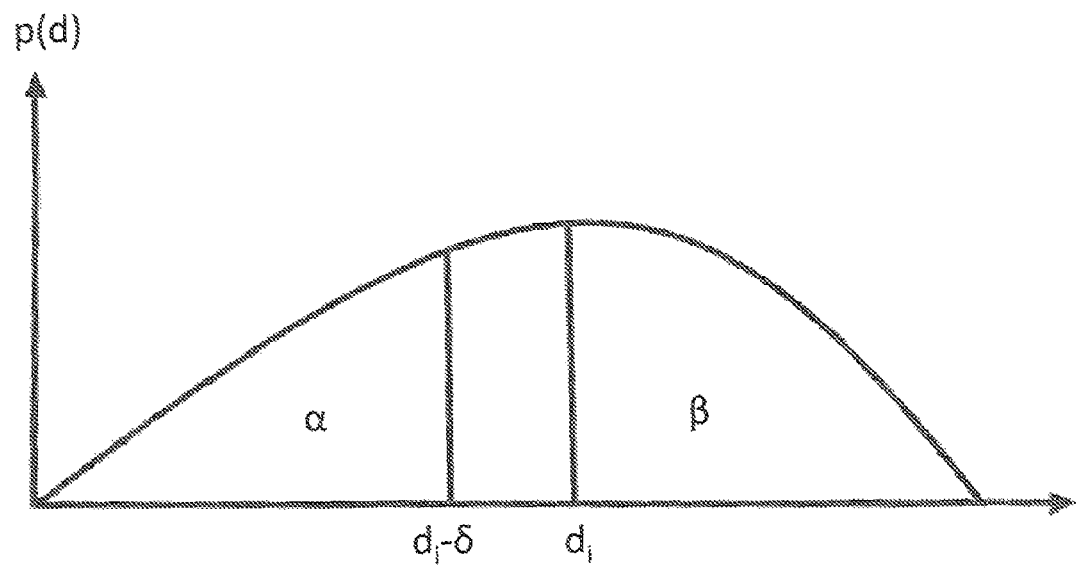
FIG. 4 illustrates a probability distribution of network peers latencies with respect to a real-time playback point of a streaming source.

Reference is made to FIG. 4, which shows an assumed shape for the distribution of the distribution level with respect to the streaming source. As the distribution of level values is controlled by the tracker, a relationship between the expected savings and this distribution can be formulated. In a network using a random selection policy, any entering peer i, having k randomly selected neighbors and being arranged at a certain level $d_i$ with respect to the streaming source determined by the tracker will search among its neighbors for the requested data content, i.e. the data subset which was rendered in real-time at the streaming source $d_i$ data subsets earlier, see FIGS. 2a and 2b. If it does not find the particular data subset, it will request it from the streaming server incurring a cost to the streaming server bandwidth. This undesired situation occurs when the k neighbours having the latest fully downloaded data subset are at a level equal to or further downstream that determined for the entering peer, i.e. fall in region β or the region defined by $d_i-\delta$ to $d_i$ of the distribution p(d).

On the other hand, if one of the k neighbouring peers is arranged at a level that falls in the region α (and has enough bandwidth), then this peer can upload to the entering peer from the requested data subset. Again with reference to FIGS. 2a and 2b, it should be noted that region α is limited by $d_i-\delta$, where δ typically amounts to the duration of one data subset. That is, if the entering peer is determined to be arranged at level three, it can download the requested data subset from a peer arranged at level two or closer to the source. Hence, an entering peer can only download from any neighbouring peer that precedes it by at least δ. Consequently, the probability $P_{di}$ for an entering peer that a randomly selected neighbouring peer is in the region α is simply the cumulative distribution function (cdf) value of the random variable d at the value $d_i-\delta$:

$$P_{\alpha_i} = cdf(d = d_i - \delta) = \int_0^{d_i-\delta} p(x)\,dx \qquad (1)$$

Thus, the level $d_i$ of the entering peer can be determined by the tracker using the teachings set forth in Equation (1) such that the requested data content can be downloaded from one of the k randomly selected peers with a sufficiently high probability. Hence, by carefully selecting an appropriate level for the entering peer, the possibility of having the entering peer download from one of its k neighbouring peers can be increased (or decreased, if required). A cost of having the entering peer downloading from a neighbouring peer with a higher probability is that the latency experienced by the entering peer increases. Thus, if for a given P2P live streaming network the probability of successful download from a neighbouring peer already is high, the latency may be selected by the tracker to be low with a still high download probability.

Further, this may be stipulated by a predetermined threshold value which the probability should exceed for the chance that the requested data content could be downloaded from a neighbouring peer should be considered great enough.

It can be envisaged that each peer will be given a list of k randomly selected neighbouring peers, as described hereinabove, in order to ensure that the determined latencies from the real-time playback point will concur with the probability distribution p(d) and thus do not have any bias. Further as has been described in the above, an entering peer will download from the streaming server when the respective latest fully downloaded data subset of each peer among the k neighbouring peers is older than the data subset that the entering peer is requesting. This situation occurs in FIG. 2b, where the tracker determines that the entering peer $p_i$ is to be arranged at $d_i=3$ and the list provided by the tracker to the entering peer $p_i$ comprises peers $p_3, p_4, p_7, p_8$ and $p_{11}$. In this case, the entering peer cannot find the required data subset DS2 at either of the listed peers. For peers $p_4$ and $p_{11}$, the latest fully downloaded data subset stored in the respective playback buffer is DS0, while peers $p_3, p_7$ and $p_8$ have DS1 as the latest fully downloaded data subset. Thus, none of the listed peers can upload the required data subset DS2 to the entering peer, since the available data subsets DS1 and DS0 both are older than the requested data subset DS2, which has as a consequence that the entering peer must turn to the streaming source for the required data subset. With reference to FIG. 4, this occurs if all k randomly selected neighbouring peers are placed at a level upstream of the entering peer, i.e. fall in region β of the probability distribution p(d).

The probability that all the k neighbouring peers will be in the region β can be expressed as a binomial experiment, where the probability of attaining zero success trials out of a total number k of trails is determined. By considering success probability as the probability of finding one neighbouring peer that falls in the region α, the probability $P_F$ of finding zero neighbouring peers that belong to region α out of k neighbouring peers can be expressed as a binomial experiment with x=0 as follows:

$$P_F(d_i) = Pr(X = 0 \mid k, P_{\alpha_i}) = \binom{k}{0} P^0 (1 - P_{\alpha_i})^k \qquad (2)$$

$$P_F(d_i) = (1 - P_{\alpha_i})^k$$

Thus, $P_F(d_i)$ expresses the probability that a downloading peer at a determined level $d_i$ will have to stream required data content from the streaming server since no neighbouring peer out of the k randomly selected peers is located in region α of FIG. 4. Analogously, the probability that an entering peer at level $d_i$ will find at least one neighbouring peer out of the k randomly selected peers in region α (from which it may download the requested data content) can be expressed as $1-P_F(d_i)$. This embodiment presents a simple model which the tracker can use to determine level $d_i$ for an entering peer such that data content can be streamed from a neighbouring peer with a certain probability.

However, this does not take into account finite upload capacity of each one of the network peers. A situation may occur where an entering peer at level $d_i$ has found a neighbouring peer out of the k randomly selected peers in region α, but the neighbouring peer cannot upload to the entering peer due to limitations in upload capacity. In an embodiment of the present invention described in the following, the tracker takes into account the finite upload capacity of the network peers.

A discrete probability distribution p(d) will be used since the distribution levels are expressed as discrete values. Thus, the levels take on discrete values $[d_1, d_2, d_3, \ldots]$, where $d_{n+1}-d_n=\delta$ for all n. A discrete probability distribution implies that the expected number of peers at level $d_i$ are $N_i=p(d_i)N$. For any level $d_j$, the number of download requests from peers at level $d_i$ is, in case the download requests are made to the peers in region α in a random and unbiased manner:

$$R_{ij} = \begin{cases} N_{pi} \dfrac{p(d_j)}{P_{\alpha_i}} & \text{if } d_j \le d_i - \delta \\ 0 & \text{otherwise} \end{cases} \qquad (3)$$

Where $N_{pi}=(1-P_F(d_i))N_i$ is the expected number of peers at level $d_i$ that will attempt to download from peers in region α. The reason only a subset $N_{pi}$ of all peers $N_i$ at level $d_i$ will make a successful attempt to download from other peers in region α is that there is a probability that peers at level $d_i$ will have no neighbouring peers in α and hence will have to download from the streaming source.

The total number of download requests that neighbouring peers make to peers at level $d_j$ is thus:

$$R_j = \sum_{i=j+1}^{\infty} R_{ij}$$

In order to find how many of these requests will be satisfied given that the number of peers at level $d_j$ is expressed as each of them having a capacity of u simultaneous uploads, the probability that a peer at level $d_j$ will respond to l requests for download from the total number $R_j$ of download requests as:

$$B_j(l) = \binom{R_j}{l}\left(\frac{1}{N_j}\right)^l\left(1-\frac{1}{N_j}\right)^{R_j-l} \quad (4)$$

where u is the number of simultaneous uploads per peer and is determined by bandwidth distribution $p_{bw}$ and the streaming bitrate br. The number of simultaneous uploads per peer is thus calculated as $u=p_{bw}/br$. As an example, if a given peer is assigned a bandwidth of 1 Mb/s and the streaming bit rate is 200 kB/s, the peer can simultaneously upload to five other peers.

$B_j(l)$ determines the share of peers at level $d_j$ that will receive l download requests. For l≤u, the number of successful requests will be $l \times B_j(l) \times N_j$, while for l>u, the number of successful requests will be $u \times B_j(l) \times N_j$. Thus, peers at level $d_j$ receive $R_j$ download requests, and each request will fall on one of the plurality $N_j$ of peers randomly, wherein the distribution of download requests can be modelled as a binomial distribution.

Therefore, the expected number of successful responses that peers at level $d_j$ make to random download requests from neighbouring peers (i.e. the load on peers at level $d_j$) is:

$$L_{ju} = \left(\sum_{l=1}^{u} lB_{ju}(l) + u\left(1 - \sum_{l=0}^{u} B_{ju}(l)\right)\right)N_{ju} \quad (5)$$

and hence the expected number of peers streaming from the P2P network is the total number of successful downloads:

$$L = \sum_{j=0}^{\infty} L_j.$$

The probability that a download request which a neighbouring peer makes to peers at level $d_j$ is successful can be calculated as the ratio between the expected number of successful responses and the total number of download requests, i.e. $L_j/R_j$.

Consequently, the probability that a download request from a peer at level $d_i$ will fall in region α is $(1-P_F(d_i))$, i.e. the probability that a peer at level $d_i$ will find at least one neighbouring peer out of the k randomly selected peers in region α from which it may download the requested data content can be expressed as $1-P_F(d_i)$. The probability that one of those requests to peers in region α actually will go to peers at the particular level $d_j$ is $p(d_j)/P\alpha_i$ (deducted from Equation (3) which defines this probability for a number $N_i$ of peers at level $d_i$). These are modelled as independent probabilities, and the probability that a peer at level $d_i$ will be able to download content from a neighbouring peer at a particular level $d_j$ (given the bandwidth limitations) can be expressed as a product of these three probabilities. It then follows that the probability that a peer at a level $d_j$ makes a successful download from the P2P network, i.e. a download from any peer at a level lower than $d_i$, will be expressed as a sum of probabilities:

$$P_s(d_i) = (1-P_F(d_i))\sum_{j=0}^{j=i-1} \frac{L_j}{R_j}\frac{p(d_j)}{P_{\alpha_i}}, \quad (6)$$

Hence, the summation covers all peers at a level lower than $d_i$ and not only peers at a particular level of $d_j$.

Expected streaming source savings will relate to the probability of successful download by each peer in the network:

$$\text{savings} = \sum_{i=0}^{\infty} P_s(d_i)p(d_i). \quad (7)$$

The savings can however be expressed in a simpler manner as the ratio of successful downloads to the peers in the network and the total number of peers in the network, i.e.:

$$\text{savings} = \frac{L}{N}. \quad (8)$$

This form for calculating the savings is conceptually simpler and computationally more efficient. Both Equations (7) and (8) yield the same result.

To recapitulate, the situation where a downloading peer at a determined level $d_i$ will have to stream required data content from the streaming server occurs if:

(a) no neighbouring peer out of the k randomly selected peers is located in region α, i.e. no neighbouring peer is arranged at a level of $d_i-\delta$ or less, or (b) one or more neighbouring peers out of the k randomly selected peers are located in region α, but the neighbouring peers cannot upload due to limitations in upload capacity.

To put it in another way, even though neighbouring peers can be located in region α illustrated in FIG. 4, the located neighbouring peers may be restrained from effecting an upload to the requesting peer due to bandwidth/upload capacity limitations. Equation (6) set forth in the above takes these bandwidth limitations into account and calculates $P_s(d_i)$, i.e. the probability that a peer at a level $d_i$ makes a successful download from the P2P network.

[3.5.2. Prefer Nearest Policy]

As has been previously described, for instance with reference to FIG. 3, when a peer enters the network, it receives from the tracker a list of k randomly selected neighbouring peers from which requested data content can be downloaded with an expected probability depending on a determined level at which the entering peer is to be arranged with respect to the streaming source. Thus, the entering peer is enabled to download, with the expected probability, the requested data content from a selected one of the k randomly selected peers at a lower level than that determined for the entering peer (i.e. at a level upstream from the entering peer).

In P2P networks, there is a risk that peers being arranged at a low distribution level with respect to the streaming source, i.e. peers being located close to the streaming source, will be assigned a greater load than those peers which are further away from the streaming source, i.e. peers arranged at a higher level, even if the distribution over levels is assumed to be uniform. That is because peers at level $d_i$ potentially will be a target for content requests from all peers at levels $d_i+\delta$, $d_i+2\delta$, $d_i+3\delta$, and so on. Hence, if streaming server savings are to be improved, there is a trade-off between increasing density among peers having low latency with respect to the real-time playback point, i.e. peers arranged at a level closer to the source, to handle the load from peers having higher latency, and increasing the probability that peers will download directly from the streaming server since the density of peers closes to the streaming server is increased. Therefore, it may be desirable to construct the P2P network such that a selection policy is applied where peers will prioritize their nearest neighbouring peers, in which case a significant load balancing among the peers in the network can be achieved. Hence, in an embodiment of the present invention, an entering peer is instructed to prioritize its nearest neighbouring peer(s) at a level which is lower than the level determined for the entering peer.

Figure 5:
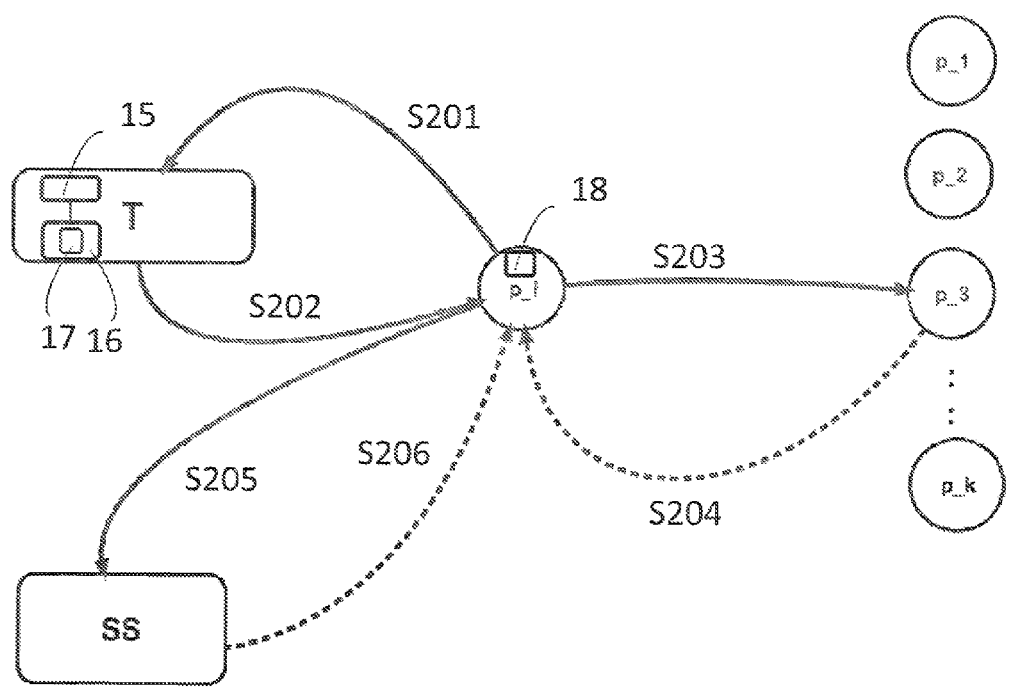
FIG. 5 illustrates an embodiment of the present invention where an entering peer requests data from a selected peer among a plurality of neighbouring peers according to an embodiment of the present invention.

FIG. 5 shows a P2P network in which embodiments of the present invention are implemented. Continuous lines denote request/reply messages, while dashed lines denote streaming channels. A new peer $p_i$ enters the network and requests the tracker T in step S201 via its communication interface to receive data content originally streamed from the streaming source SS. The tracker determines the level at which the entering peer $p_i$ is to be arranged. By controlling the level, the expected probability of a successful download can be varied accordingly; the more downstream the level, the higher the chance of successful download. However, this will on the other hand imply further delay from the real-time playback point RT.

In step S202, the tracker T provides the entering peer $p_i$ with a list of a plurality k of peers from which the data content can be downloaded. Further, the list indicates the level d at which each peer among the k peers is arranged in the P2P network in order to have the entering peer subsequently give priority to a first peer being arranged at a level closer to that of the entering peer than a second peer among the plurality of selected peers, when the entering peer $p_i$ is to select a peer on the list from which to download the requested data content.

Further, as to the tracker T selecting a plurality k of peers, this can be undertaken in a number of different ways. In a first alternative, the plurality of peers are randomly selected, thus making it easy for the tracker T to make the selection. In a second alternative, the tracker T first selects a group of peers and then filters out a plurality k of peers having a latency lower than that of the entering peer $p_i$. In a third alternative, the tracker T provides the entering peer with a list which is more biased towards peers who have joined the network recently while incorporating the respective level d, which peers are more likely to have available upload bandwidth since recently joining peers are less likely to yet have been fully loaded. Even further alternatives can be envisaged, such as e.g. whether peers are network address translation (NAT) compatible or not. In the following, it will be assumed that the k peers are randomly selected by the tracker T.

The list provided by the tracker T to the entering peer $p_i$ in step S202 could have the appearance set out in Table 1.

TABLE 1

| Peer no. | Level (d) |
| --- | --- |
| $p_i$ | 3 |
| $p_1$ | 1 |
| $p_2$ | 1 |
| $p_3$ | 2 |
| $p_4$ | 3 |
| $p_5$ | 3 |
| $p_6$ | 3 |
| $p_7$ | 4 |
| $p_8$ | 4 |

TABLE 1-continued

| Peer no. | Level (d) |
| --- | --- |
| $p_9$ | 4 |
| $p_{10}$ | 4 |

Figure 6:
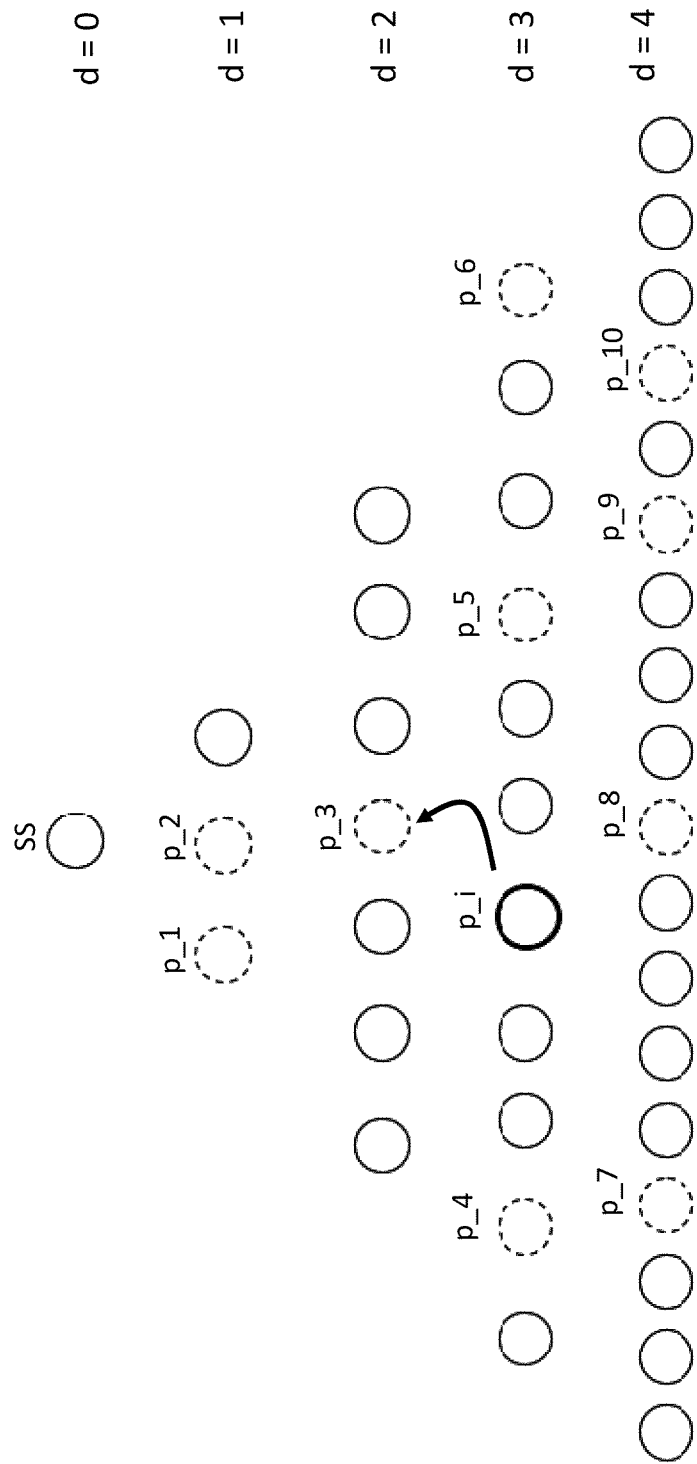
FIG. 6 illustrates a data request selection policy according to an embodiment of the present invention.

Reference is further made to FIG. 6 showing arranging of peers in levels according to Table 1 starting from the streaming server SS at d=0. The dotted circles represent listed peers provided by the tracker to the entering peer $p_i$.

With reference to FIG. 5, the entering peer requests in step S203 a selected peer on the list, i.e. a selected one of peers $p_1, p_2, p_3, \ldots, p_k$, to supply it with the latest subset of data given the determined level $d_i$ at which the entering peer $p_i$ is arranged. If it exists at least one peer out the k selected peers which has a latency with respect to the real-time playing point that is lower than that determined for the entering peer, it is possible that the requested data content can be uploaded to the entering peer $p_i$. As can be seen in Table 1 and corresponding FIG. 6, peer $p_3$ is selected by the entering peer $p_i$ since it is located at the nearest level of the peers selected by the tracker T and is thus given priority among the plurality of peers selected by the tracker T. A request from the entering peer $p_i$ to the neighbouring peer $p_3$ to download a desired piece of content is thus successful (given that the peer $p_3$ has available upload capacity, which in this case is assumed). The neighbouring peer $p_3$ subsequently uploads, in step S204, the requested data content to the entering peer $p_i$. If no peer exists among the listed peers which is arranged at a level with respect to the streaming source that is lower than that determined for the entering peer, the requested data content cannot be uploaded in step S204 to the entering peer. In that case, the entering peer $p_i$ will in step S205 turn to the streaming server SS for the requested data content, which in its turn will upload the requested data content to the entering peer in step S206. The entering peer $p_i$ may also have to turn to the streaming server SS in case one or more neighbouring peers out of the k selected peers are located in region α, but cannot upload due to limitations in bandwidth capacity. Hence, the entering peer request data from its nearest peer on the list. This scenario is modeled by applying a download selection policy where a peer with latency $d_i$ requests data from a peer having latency $d_j$. Thus, a different probability distribution for peer requests is assumed with respect to the previously described download selection policy where an entering peer randomly selects a neighbouring peer from the list provided by tracker.

When applying the nearest-peer-selection policy according to embodiments of the present invention, it is first assumed that for any peer at level $d_i$, the number of neighbours in region $\alpha_i$ out of the k neighbours is c. The probability that no peer out of the c neighbours will be arranged at level i−δ is:

$$p_f^c(d_{i-\delta}) = \left(1 - \frac{p(d_{i-\delta})}{p_{\alpha_i}}\right)^c.$$

Furthermore, the probability that no peer out of the c neighbouring peers will be arranged at level i−2δ (given that there were no neighbouring peers at level i−δ) is:

$$p_f^c(d_{i-2\delta}) = \left(1 - \frac{p(d_{i-2\delta})}{p_{\alpha_{i-\delta}}}\right)^c.$$

In general $p_f^c(d_{i-\omega\delta})$ is the probability of having none of c neighbouring peers in region $\alpha_i$ at level $i-\omega\delta$ (given that none of the neighbouring peers were located at level $i-\delta$, $i-2\delta, \ldots, i-\omega\delta$).

Further, the probability of having no neighbouring peer in the interval $[j+\delta, i-\delta]$ is:

$$p_{f_{i,j}}^c = \prod_{w=j+\delta}^{i-\delta} p_f^c(d_w),$$

where $j \leq i-\delta$ and $(1-p_f^c(j))$ is the probability that at least one of the c neighbouring peers is arranged at level j and all c neighbours also fall in region $\alpha_{j+1}$. As it has been assumed that all c neighbouring peers fall in region $\alpha_i$, the probability of having all c neighbouring peers fall in region $\alpha_{j+1}$ is simply $p_{f_{i,j}}^c$. Then, for peers having latency $d_i$, the probability of having at least one neighbouring peer arranged at level $d_j$ given that all c neighbouring peers fall in $\alpha_{j+1}$ is:

$$\rho_{i,j}^c = \left(1 - \left(1 - \frac{p(d_j)}{p\alpha_{j+1}}\right)^c\right) \prod_{w=j+\delta}^{i-\delta} \left(1 - \frac{p(d_w)}{p\alpha_{w+1}}\right)^c$$

$$= (1 - p_f^c(d_j)) p_{f_{i,j}}^c$$

Next, this probability is calculated for all values of c, i.e. for $c=1, \ldots, k$ as follows:

$$\rho_{ij} = \sum_{c=1}^{k} \binom{k}{c} (\rho_{\alpha_i})^c (1 - \rho_{\alpha_i})^{k-c} \rho_{i,j}^c,$$

which in this particular embodiment is the distribution of the $N_{pi}$ requests in region $\alpha_i$.

Further, in a more elaborate selection policy, the tracker not only takes into account distribution level but also upload capacity of the plurality of selected peers, i.e. the upload capacity u, where u generally is defined as number of possibly simultaneous uploads per peer and is determined by bandwidth distribution $p_{bw}$ and the streaming bitrate br. The number of simultaneous uploads per peer is thus calculated as $u=p_{bw}/br$. As an example, if a given peer is assigned a bandwidth of $p_{bw}=1$ Mb/s and the streaming bit rate br is 200 kB/s, the peer can simultaneously upload to five other peers, i.e. $u=5$.

In the previous examples, the tracker did not take into account a situation where a joint probability of distribution level and upload capacity p(u, d) exists. If the distribution level and upload capacity is modelled as joint probability variables, it is possible to attain even better results in determining distribution level of an entering peer. The probability distribution of distribution level $d_i$ with respect to the streaming source is the sum over u of the joint probability p(u, $d_i$) as follows:

$$p(d_i) = \sum_u p(u, d_i)$$

The number of download requests, $R_{iju}$, from peers with latency $d_i$ to peers with latency $d_j$ and upload capacity u, is:

$$R_{iju} = \begin{cases} N_i \rho_{iju} & \text{if } j \leq i - \delta \\ 0 & \text{otherwise} \end{cases}, \quad (9)$$

where $$\rho_{iju} = \rho_{ij} \frac{p(u, d_j)}{p(d_j)}$$

In an embodiment of the present invention, the tracker T of FIG. 5 samples a conditional probability distribution of level and upload capacity p(d|u) for the network peers. Hence, the tracker T gives each entering peer its position in the network in terms of distribution level d from the streaming source SS based on its upload capacity u according to the conditional distribution p(d|u)=p(u, d)/p(u), i.e. the probability that an entering peer will be arranged at a level d given that it has an upload capacity of u. This is further advantageous in that peers having higher upload capacity can be arranged at a lower level, i.e. be placed closer to the streaming source SS. Thus, the joint distribution p(u, d) is the desired distribution that the P2P network will eventually settle to. To enable this, in an embodiment, each entering peer provides its upload capacity to the tracker T with the request as submitted in step S201.

As a consequence, in addition to taking into account nearest neighbouring peers, their respective upload capacity is also considered and further given priority when the entering peer $p_i$ determines to which listed peer a download request should be submitted. It is here assumed that the probability distribution of requests from peers having latency $d_i$ to neighbouring peers having latency $d_j$ and bandwidth u is proportional to the density of $u \times p(u, d)$, i.e. the density of the joint probability p(u, d) of the latency and bandwidth weighted with the bandwidth u. The following modification is undertaken accordingly:

$$R_{iju} = \begin{cases} N_i \hat{\rho}_{iju} & \text{if } j \leq i - \delta \\ 0 & \text{otherwise} \end{cases}, \quad (10)$$

where $$\hat{\rho}_{iju} = \rho_{ij} \frac{u \, p(u, d_j)}{\sum_u u \, p(u, d_j)}.$$

This selection policy tends to behave as if there is a central coordination, since the tracker will have a peer prefer to request data content from the nearest possible neighbouring peer, which is similar to the concept of centrally managed systems where each level utilize the required bandwidth from the preceding level. Also, this policy handles load balancing among peers in that a request is made to a given peer relative to its upload bandwidth u.

Figure 7:
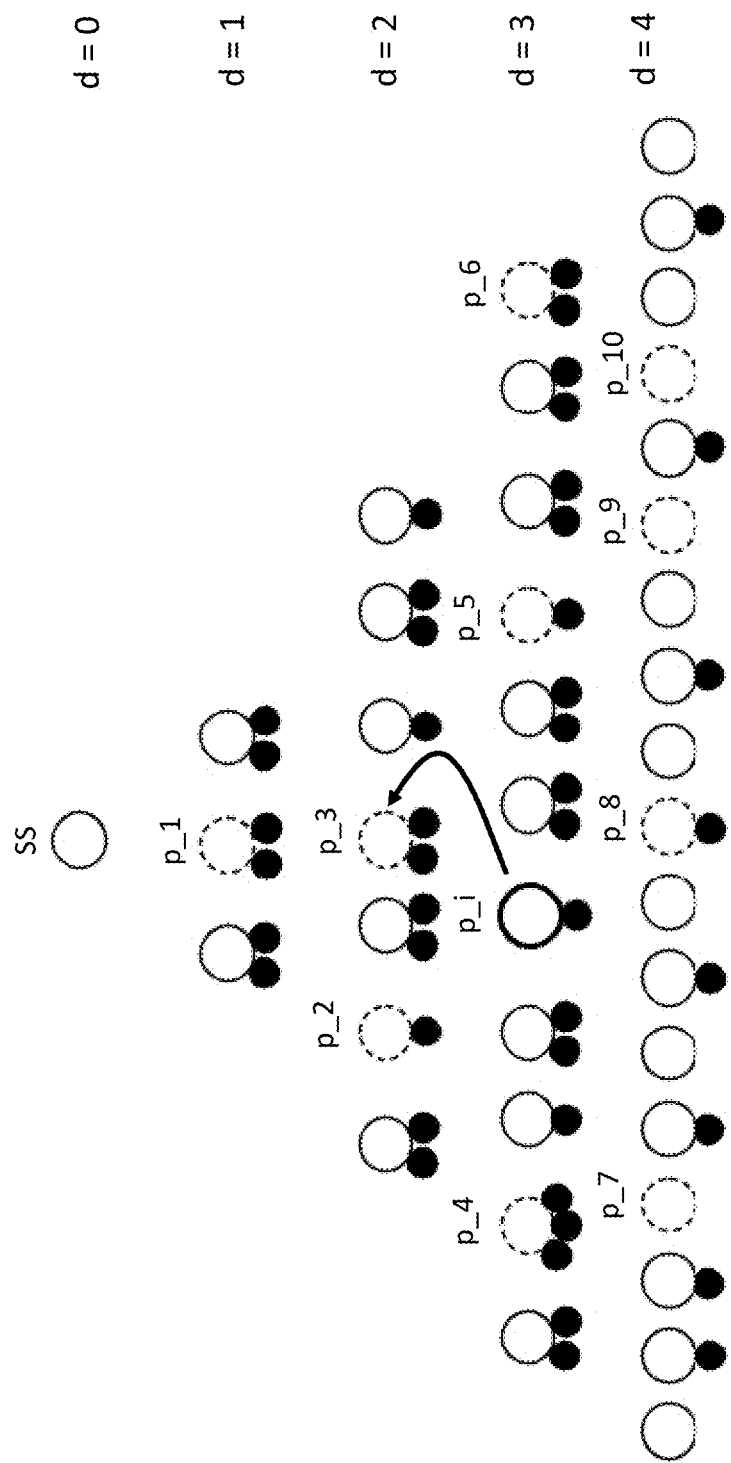
FIG. 7 illustrates a data request selection policy according to a further embodiment of the present invention.

To illustrate a further embodiment of the present invention, where peers are further given priority by also considering their upload capacity, reference is made to Table 2 and FIG. 7. The list provided by the tracker T to the entering peer $p_i$ in step S202 of FIG. 5 could have the appearance set out in Table 2.

TABLE 2

| Peer no. | Upload capacity (u) | Level (d) |
|---|---|---|
| $p_i$ | 1 | 3 |
| $p_1$ | 2 | 1 |

TABLE 2-continued

| Peer no. | Upload capacity (u) | Level (d) |
|---|---|---|
| $p_2$ | 1 | 2 |
| $p_3$ | 2 | 2 |
| $p_4$ | 3 | 3 |
| $p_5$ | 1 | 3 |
| $p_6$ | 2 | 3 |
| $p_7$ | 0 | 4 |
| $p_8$ | 1 | 4 |
| $p_9$ | 0 | 4 |
| $p_{10}$ | 0 | 4 |

Reference is further made to FIG. 7 showing arranging of peers in levels according to Table 2 starting from the streaming server SS at d=0. The dotted circles represent listed peers provided by the tracker and the smaller filled circles represent upload capacity u.

With reference to FIG. 5, a new peer $p_i$ enters the network and requests the tracker T in step S201 via its communication interface to receive data content originally streamed from the streaming source SS. The tracker determines the level at which the entering peer $p_i$ is to be arranged, for instance by sampling a conditional probability distribution of level and upload capacity p(d|u) for the network peers. Hence, the tracker T gives each entering peer its position in the network in terms of distribution level d from the streaming source SS based on its upload capacity u according to the conditional distribution p(d|u)=p(u, d)/p(u), i.e. the probability that an entering peer will be arranged at a level d given that it has an upload capacity of u.

In step S202, the tracker T hence provides the entering peer $p_i$ with a list of a plurality k of peers from which the data content can be downloaded. Further, the list indicates the level d at which each peer among the k peers is arranged in the P2P network in order to have the entering peer subsequently give priority to a first peer being arranged at a level closer to that of the entering peer than a second peer among the plurality of selected peers, when the entering peer $p_i$ is to select a peer on the list from which to download the requested data content.

In step S202, the tracker T provides the entering peer $p_i$ with a list of a plurality k of peers from which the data content can be downloaded. Further, in this particular embodiment, the list indicates bandwidth capacity u of each among the k peers in order to have the entering peer subsequently give priority to a first peer having higher bandwidth capacity u than a second peer, if the first and the second peer are arranged at the same (nearest) level among the plurality of selected peers, when the entering peer $p_i$ is to determine to which peer on the list a request for download of data content is to be submitted.

As can be seen in Table 2 and corresponding FIG. 7, neighbouring peers $p_2$ and $p_3$ are located at the second level, i.e. the level nearest the third level at which the entering peer $p_i$ is arranged. Thus, in a previously described embodiment, where the upload capacity of the neighbouring peers were not taken into account when the entering peer $p_i$ was to select a peer for submission of a download request, any single one of the neighbouring peers $p_3$ and $p_3$ could have been subject to the download request. However, in this particular embodiment, neighbouring peer $p_2$ has u=1 and neighbouring peer $p_3$ has u=2, meaning that the entering peer $p_i$ will select peer $p_3$ as recipient of the download request in step S203 and, which request to download a desired piece of content is successful if peer $p_3$ has available upload capacity, which in this case is assumed. The neighbouring peer $p_3$ subsequently uploads, in step S204, the requested data content to the entering peer $p_i$. If no peer should exist among the listed peers which is arranged at a level with respect to the streaming source that is lower than that determined for the entering peer, the requested data content cannot be uploaded in step S204 to the entering peer. In that case, the entering peer $p_i$ will in step S205 turn to the streaming server SS for the requested data content, which in its turn will upload the requested data content to the entering peer in step S206. The entering peer $p_i$ may also have to turn to the streaming server SS in case one or more neighbouring peers out of the k selected peers are located in region α, but cannot upload due to limitations in bandwidth capacity. Hence, the entering peer request data from its nearest peer on the list but further prioritize upload capacity in case two or more peers are located at the nearest level.

In this context, the tracker T provides in yet another embodiment of the present invention the entering peer with a list which is more biased towards peers who have joined the network recently while incorporating the respective upload capacity, which peers are more likely to have available upload bandwidth since recently joining peers are less likely to yet have been fully loaded.

In analogy with that discussed above, depending on how the level $d_i$ for the entering peer $p_i$ is selected, the probability that the streaming server SS will have to upload the requested data content to the entering peer in step S206 can be increased or decreased. These probabilities have been discussed in detail hereinabove and will be discussed in further detail in the following. The savings in the streaming server SS bandwidth is directly related to the probability that a network peer can upload requested data content to the entering peer $p_i$.

Figure 8:
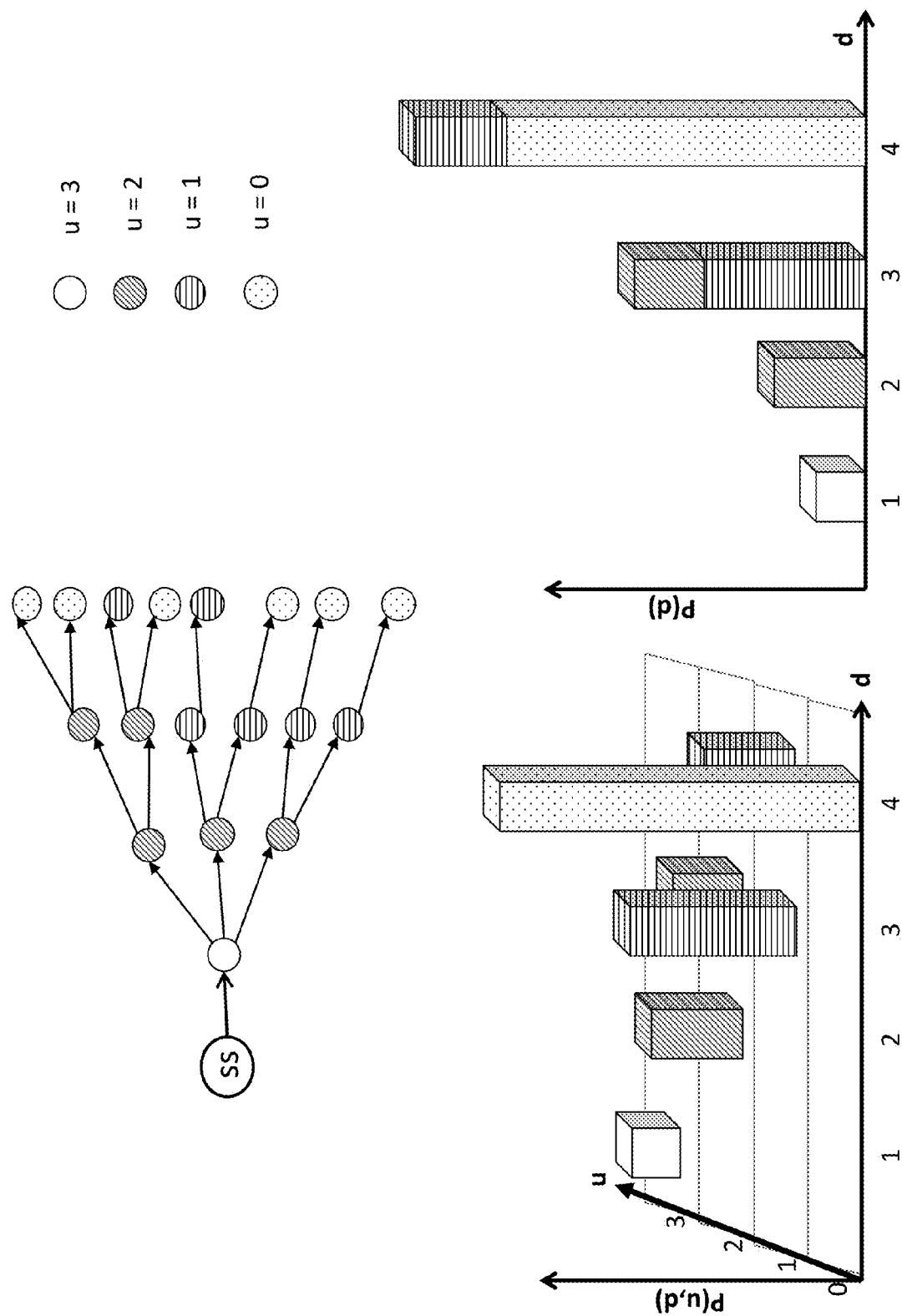
FIG. 8 illustrates joint probability of distribution level and upload capacity.

FIG. 8 illustrates joint probability of distribution level and upload capacity p(u, d). The upper left part of FIG. 8 shows a P2P network where peers are arranged at a first, second, third and fourth level with respect to a streaming source. Further, the peers in the network have an upload capacity from u=0 to u=3. The lower left part of FIG. 8 illustrates the joint probability p(u, d) on the z axis, while the y axis represents the upload capacity and the x axis represents the distribution level of the peers in the P2P network. The lower right part of FIG. 8 shows a discrete version of a p(d) distribution (previously illustrated in FIG. 4) derived from the p(u, d) distribution shown in the lower left part. That is, the p(d) distribution is formed by aggregating probability masses at each distribution level. Analogously, a p(u) distribution could be formed by aggregating the probability masses at each upload capacity measure.

If the selection policy according to embodiments of the present invention is applied, where priority further is given to peers having the highest upload capacity of two or more peers located at the nearest level, it can be assumed that each peer is more likely to request data content from a neighbouring peer with a higher bandwidth/upload capacity u. For a level $d_j$, the number of expected download requests from peers at level $d_i$ was calculated in Equation (10).

The selection policy employed in this embodiment will guarantee that no request for data content is made to a neighbouring peer having u=0 (being for instance a mobile phone). It can be seen that this selection policy takes into account the bandwidth that is available at a given level $d_j$ for a peer having a certain potential bandwidth u, i.e. by advantageously forming the term u p(u, $d_j$). Thus, in addition to allocating load on peers based on the joint probability of level and upload capacity, p(u, $d_j$), this embodiment enhance the selection policy by requesting data content with higher probability from peers having higher upload capacity, which will facilitate load balancing as peers with higher upload capacity will receive more requests than peers with low upload capacity and hence this will increase the savings, since the probability of having peers falling back on the streaming server for requested data content decreases.

The total number of download requests that neighbouring peers make to peers at level $d_j$ and upload capacity u is:

$$R_{ju} = \sum_{i=j+1}^{\infty} R_{iju}$$

In order to find how many of these requests will be satisfied given that the number of peers at level $d_j$ and upload capacity u is expressed as $N_{ju}$, the probability that a peer at level $d_j$ and upload capacity u will respond to l requests for download from the total number $R_{ju}$ of download requests as:

$$B_{ju}(l) = \binom{R_{ju}}{l}\left(\frac{1}{N_{ju}}\right)^l\left(1-\frac{1}{N_{ju}}\right)^{R_{ju}-l}$$

where $N_{ju}$=p(u, j)N is the expected number of peers at level $d_j$ and upload capacity u. Therefore, the expected number of successful responses that peers at level $d_j$ and upload capacity u make to download requests from neighbouring peers (i.e. the load on peers at level $d_j$ and upload capacity u) is:

$$L_{ju} = \left(\sum_{l=1}^{u} lB_{ju}(l) + u\left(1 - \sum_{l=0}^{u} B_{ju}(l)\right)\right)N_{ju}$$

and hence the expected number of peers streaming from the P2P network is the total number of successful downloads:

$$L = \sum_{j=0}^{\infty} \sum_{u} L_{ju}$$

and the savings will be expressed as in Equations (8) or (7).

Now, with respect to the embodiment of the invention concluded in Equation (9), i.e. the selection policy where the nearest peer is selected for receiving a download request when considering the joint probability p(u, di), $P_s$(di) can be calculated, i.e. the probability that a peer at a level di makes a successful download from the P2P network when selecting a nearest peer, with reference to Equation (6):

$$P_s(d_i) = (1 - P_F(d_i))\sum_{u}\sum_{j=0}^{j=i-1} \frac{L_{ju}}{R_{ju}}\rho_{ij}\frac{p(u, d_j)}{p(d_j)} \quad (11)$$

Thus, again with reference to FIG. 5, in this embodiment of the present invention, the probability of having a selected peer out of the k listed randomly selected peers successfully upload requested data content in step S204 to the entering $p_i$ is given by $P_s(d_i)$ expressed by Equation (11). The corresponding calculation can be made for the embodiment of the invention concluded in Equation (10), i.e. the selection policy where the nearest peer is selected for receiving a download request when considering the joint probability p(u, $d_i$), and further prioritization of upload capacity is made.

As can be seen, in addition to previously discussed advantages of the present invention, the expected savings and/or streaming source load can be estimated a priori, which has the resulting advantage that expected streaming source capacity can be calculated in advance.

Figure 9:
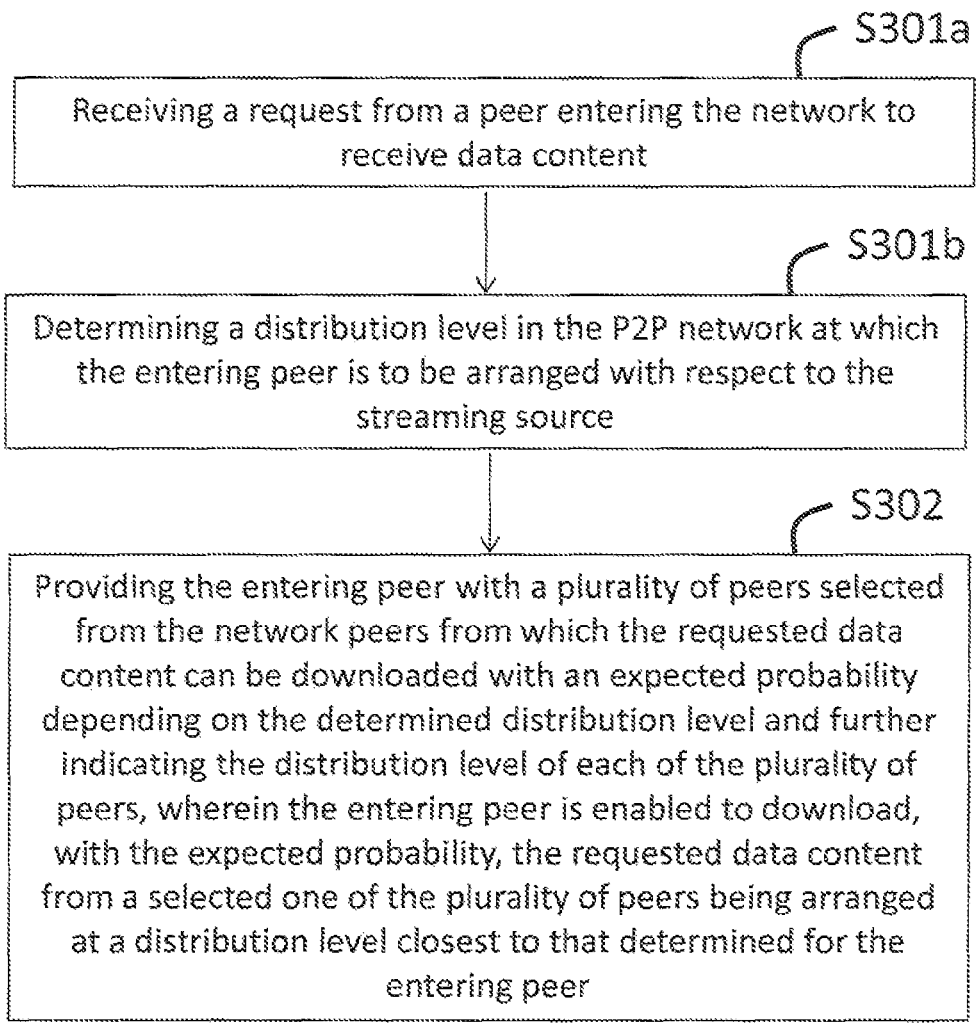
FIG. 9 shows a flowchart illustrating the method according to the first aspect of the present invention.

FIG. 9 shows a flowchart illustrating the method of arranging peers in a P2P network comprising a streaming source and network peers arranged at distribution levels in the P2P network according to the first aspect of the present invention. In a first step S301a, a tracker (previously described e.g. with reference to FIG. 5) receives a request from a peer entering the network to receive data content. Thereafter, in step S301b, the tracker determines a distribution level in the P2P network at which the entering peer is to be arranged with respect to the streaming source. Further, in step S302, the tracker provides the entering peer with a plurality of peers selected from the network peers from which the requested data content can be downloaded with an expected probability depending on the determined distribution level and further indicating the distribution level of each of the plurality of peers, wherein the entering peer is enabled to download, with the expected probability, the requested data content from a selected one of the plurality of peers being arranged at a distribution level closest to that determined for the entering peer.

Figure 10:
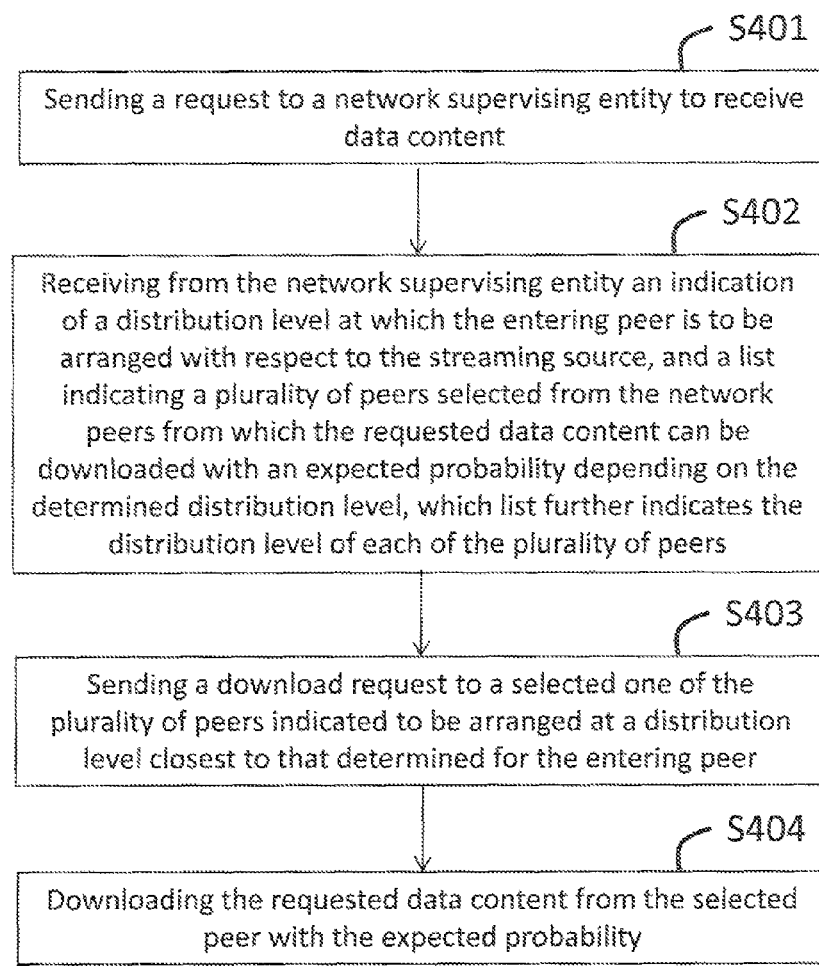
FIG. 10 shows a flowchart illustrating the method according to the first aspect of the present invention.

FIG. 10 shows a flowchart illustrating the method of arranging peers in a P2P network comprising a streaming source and network peers arranged at distribution levels in the P2P network according to the third aspect of the present invention. In a first step S401, an entering peer (in practice a peer device such as a television sets, mobile phone, a laptop, etc.) sends a request to a network supervising entity, i.e. the tracker to receive data content. Thereafter, in step S402, the entering peer receives from the tracker an indication of a distribution level at which the entering peer is to be arranged with respect to the streaming source, and a list indicating a plurality of peers selected from the network peers from which the requested data content can be downloaded with an expected probability depending on the determined distribution level, which list further indicates the distribution level of each of the plurality of peer. Further, in step S403, the entering peer sends a download request to a selected one of the plurality of peers indicated to be arranged at a distribution level closest to that determined for the entering peer. Finally in step S404, the entering peer downloads the requested data content from the selected peer with the expected probability. Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method, in a network supervising entity, of arranging peers in a peer-to-peer (P2P) network comprising a streaming source uploading data content and network peers arranged at distribution levels in the P2P network, wherein network peers at distribution levels closer to the streaming source have lower latencies than network peers at distribution levels farther from the streaming source, the method comprising:

receiving, by the network supervising entity, a request from a peer entering the network to receive the data content;

determining, by the network supervising entity, an entering peer distribution level in the P2P network at which the entering peer is to be arranged with respect to the streaming source by sampling, by the network supervising entity, a distribution level from a conditional probability distribution, wherein the conditional probability distribution is based on a network peer distribution level for each of the network peers and an upload capacity for each of the network peers;

arranging, by the network supervising entity, the entering peer at the determined entering peer distribution level in the P2P network; and providing, by the network supervising entity, the arranged entering peer with a plurality of peers selected from the network peers from which the requested data content can be downloaded with an expected probability depending on the determined entering peer distribution level, and further indicating the distribution level of each of the plurality of peers, wherein the arranged entering peer is enabled to download, with the expected probability, the requested data content from a selected one of said plurality of peers being arranged at a distribution level closest to that determined for the arranged entering peer.

2. The method of claim 1, wherein the received request comprises upload capacity of the entering peer.

3. The method of claim 1, said plurality of peers being selected among the network peers wherein only peers arranged at a distribution level lower than that determined for the entering peer are provided to the entering peer.

4. The method of claim 1, said plurality of peers being selected among the network peers having been connected to the network less than a predetermined time period.

5. The method of claim 1, said plurality of peers being randomly selected among the network peers.

6. The method of claim 1, wherein the step of providing the arranged entering peer with a plurality of peers selected from the network peers from which the requested data content can be downloaded further comprises:

indicating, by the network supervising entity, the upload capacity of each of the plurality of peers, wherein in case two or more of the plurality of peers are arranged at the closest distribution level, said selected peer is the peer of the two or more peers having a highest upload capacity.

7. The method according to claim 6, wherein the probability that the arranged entering peer is capable of downloading the requested data content from a selected one of said plurality of peers is determined on the basis of the joint probability of the distribution level and upload capacity, which joint probability further is weighted with the upload capacity of the respective peer of said plurality of peers.

8. The method of claim 1, further comprising:

estimating, by the network supervising entity, streaming source savings based on the expected probability that the entering peer is able to download the requested data content.

9. The method of claim 8, wherein the estimated streaming source savings are determined as a sum of expected probabilities that the network peers are able to download a requested data content.

10. The method of claim 8, wherein the estimated streaming source savings are calculated as the ratio of successful network peer downloads to total number of network peers.

11. A method, in an entering peer, of requesting data content in a peer-to-peer (P2P) network comprising a streaming source uploading data content and a plurality of network peers arranged at distribution levels in the P2P network, wherein network peers at distribution levels closer to the streaming source have lower latencies than network peers at distribution levels farther from the streaming source, the method comprising:

sending, from the entering peer, a request to a network supervising entity to receive the data content;

receiving, by the entering peer, an indication of a determined entering peer distribution level at which the entering peer is to be arranged with respect to the streaming source, the determined entering peer distribution level being sampled from a conditional probability distribution, wherein the conditional probability distribution is based on a network peer distribution level for each of the network peers and an upload capacity for each of the network peers, and a list indicating a plurality of peers selected from the network peers from which the requested data content can be downloaded with an expected probability depending on the determined entering peer distribution level and which list further indicates the distribution level of each of the plurality of peers;

sending, by the entering peer, a download request to a selected one of said plurality of peers indicated to be arranged at a distribution level closest to that determined for the entering peer; and downloading, by the entering peer, the requested data content from said selected peer with the expected probability.

12. The method of claim 11, wherein the list further indicates upload capacity of each of the plurality of peers, and in case two or more of the plurality of peers are arranged at the closest distribution level, said selected peer to which the download request is sent is the peer of the two or more peers having a highest upload capacity.

13. A device for arranging peers in a peer-to-peer (P2P) network comprising a streaming source uploading data content and network peers arranged at distribution levels in the P2P network, wherein network peers at distribution levels closer to the streaming source have lower latencies than network peers at distribution levels farther from the streaming source, the device comprising a processing unit being arranged to:

receive a request from a peer entering the network to receive the data content;

determine an entering peer distribution level in the P2P network at which the entering peer is to be arranged with respect to the streaming source by sampling a distribution level from a conditional probability distribution, wherein the conditional probability distribution is based on a network peer distribution level for each of the network peers and an upload capacity for each of the network peers;

arrange the entering peer at the determined entering peer distribution level in the P2P network; and provide the arranged entering peer with a plurality of peers selected from the network peers from which the requested data content can be downloaded with an expected probability depending on the determined entering peer distribution level, and further to indicate the distribution level of each of the plurality of peers, wherein the arranged entering peer is enabled to download, with the expected probability, the requested data content from a selected one of said plurality of peers being arranged at a distribution level closest to that determined for the arranged entering peer.

14. The device of claim 13, wherein the received request comprises upload capacity of the entering peer.

15. The device of claim 13, the processing unit further being arranged to select said plurality of peers among the network peers wherein only peers arranged at a distribution level lower than that determined for the entering peer are provided to the entering peer.

16. The device of claim 13, the processing unit further being arranged to select said plurality of peers among the network peers having been connected to the network less than a predetermined time period.

17. The device of claim 13, the processing unit further being arranged to randomly select said plurality of peers among the network peers.

18. The device of claim 13, wherein the processing unit further is arranged to, when providing the arranged entering peer with a plurality of peers selected from the network peers from which the requested data content can be downloaded:
  indicate the upload capacity of each of the plurality of peers, wherein in case two or more of the plurality of peers are arranged at the closest distribution level, said selected peer is the peer of the two or more peers having a highest upload capacity.

19. The device of claim 18, wherein the probability that the arranged entering peer is capable of downloading the requested data content from a selected one of said plurality of peers is determined on the basis of the joint probability of the distribution level and upload capacity, which joint probability further is weighted with the upload capacity of the respective peer of said plurality of peers.

20. The device of claim 13, the processing unit further being arranged to estimate streaming source savings based on the expected probability that the entering peer is able to download the requested data content.

21. The device of claim 20, the processing unit further being arranged to estimate the streaming source savings as a sum of expected probabilities that the network peers are able to download a requested data content.

22. The device of claim 20, the processing unit further being arranged to estimate the streaming source savings as the ratio of successful network peer downloads to total number of network peers.

23. A peer device for requesting data content in a peer-to-peer (P2P) network comprising a streaming source uploading data content and a plurality of network peers arranged at distribution levels in the P2P network, wherein network peers at distribution levels closer to the streaming source have lower latencies than network peers at distribution levels farther from the streaming source, the device comprising a processing unit being arranged to:
  send a request to a network supervising entity to receive the data content;
  receive an indication of a determined entering peer distribution level at which the peer device is to be arranged with respect to the streaming source, the determined entering peer distribution level being sampled from a conditional probability distribution, wherein the conditional probability distribution is based on a network peer distribution level for each of the network peers and an upload capacity for each of the network peers, and a list indicating a plurality of peers selected from the network peers from which the requested data content can be downloaded with an expected probability depending on the determined entering peer distribution level, which list further indicates the distribution level of each of the plurality of peers;
  send a download request to a selected one of said plurality of peers indicated to be arranged at a distribution level closest to that determined for the entering peer; and
  download the requested data content from said selected peer with the expected probability.

24. The peer device of claim 23, wherein the list further indicates upload capacity of each of the plurality of peers, and in case two or more of the plurality of peers are arranged at the closest distribution level, the processing unit further is arranged to:
  send the download request to said selected peer being the peer of the two or more peers having a highest upload capacity being arranged at a distribution level closest to that determined for the entering peer.

* * * * *